US006985720B2

United States Patent
Qu et al.

(10) Patent No.: US 6,985,720 B2
(45) Date of Patent: Jan. 10, 2006

(54) APPARATUS AND METHOD FOR TRANSPARENT AND INTEGRATED WIRELESS MESSAGING IN A MULTI-MODE ENVIRONMENT

(75) Inventors: Hai Qu, San Diego, CA (US); Guangming Shi, San Diego, CA (US)

(73) Assignee: QUALCOMM, Incorporated, San Diego, CA (US)

( * ) Notice: Subject to any disclaimer, the term of this patent is extended or adjusted under 35 U.S.C. 154(b) by 299 days.

(21) Appl. No.: 10/194,207

(22) Filed: Jul. 12, 2002

(65) Prior Publication Data

US 2004/0203945 A1 Oct. 14, 2004

(51) Int. Cl.
H04Q 7/20 (2006.01)
(52) U.S. Cl. ............................... 455/412.1; 455/435.3; 455/552.1
(58) Field of Classification Search ................ 455/466, 455/412.1, 414.1, 445, 435.1–3, 403, 550.1, 455/552.1, 428
See application file for complete search history.

(56) References Cited

U.S. PATENT DOCUMENTS

| | | | |
|---|---|---|---|
| 6,226,527 B1 * | 5/2001 | Dalsgaard et al. | 455/553.1 |
| 6,292,473 B1 * | 9/2001 | Duske et al. | 370/316 |
| 6,697,415 B1 * | 2/2004 | Mahany | 375/130 |
| 6,912,407 B1 * | 6/2005 | Clarke et al. | 455/556.2 |
| 6,915,138 B2 * | 7/2005 | Kraft | 455/466 |
| 2002/0059434 A1 * | 5/2002 | Karaoguz et al. | 709/228 |
| 2002/0094811 A1 * | 7/2002 | Bright et al. | 455/433 |
| 2002/0099799 A1 * | 7/2002 | Kolsky | 709/219 |
| 2002/0168965 A1 * | 11/2002 | Gregory et al. | 455/412 |
| 2002/0187804 A1 * | 12/2002 | Narasimha et al. | 455/552 |
| 2004/0156487 A1 * | 8/2004 | Ushiki et al. | 379/88.22 |
| 2004/0166832 A1 * | 8/2004 | Portman et al. | 455/412.1 |
| 2004/0203942 A1 * | 10/2004 | Dehlin | 455/466 |
| 2004/0224668 A1 * | 11/2004 | Shell et al. | 455/412.1 |
| 2005/0148351 A1 * | 7/2005 | Reding et al. | 455/466 |

\* cited by examiner

Primary Examiner—Cong Van Tran
(74) Attorney, Agent, or Firm—Philip R. Wadsworth; Thien T. Nguyen; S. Hossain Beladi

(57) ABSTRACT

An apparatus and method for messaging in a multi-mode communication environment and, multiple message services environment. Message content is received at a messaging application for a message to be sent by a multi-mode wireless device. The messaging application provides the multiple message services. An available communication mode of the multi-mode wireless device is determined, and the message content is examined to determine at least one usable message service from the plurality of message services operable with the available communication mode. A preferred message service is selected from the at least one usable message service.

13 Claims, 4 Drawing Sheets

APPARATUS AND METHOD FOR TRANSPARENT AND INTEGRATED WIRELESS MESSAGING IN A MULTI-MODE ENVIRONMENT

BACKGROUND

1. Field

This invention relates to wireless communication, and more particularly to message services in a multiple communication modes environment.

2. Background

Various communication systems operating according to different communication protocols provide for communication of messages. Generally, communication of messages are provided through multiple message services. One of the message services is the short message service (SMS). The SMS is a wireless message service that provides a medium for communication of alphanumeric messages of limited size. The communication of SMS messages may be between mobile devices, or a mobile device and a wireless network. The SMS may be used for a variety of communication services such as electronic mail, paging, facsimile, voice mail, or Internet access. The SMS is available in communication systems operating in accordance with the Global System for Mobile Communications (GSM) standard, and code division multiple access (CDMA) standards, such as CDMA1X, CDMA2000, and WCDMA. The standards may include a specific set of protocols for communication of data which can be used for conveying SMS messages. Such specific protocols include the General Packet Radio Service (GPRS) and the Universal Mobile Telecommunications Service (UMTS).

Another type of message services is the enhanced message service (EMS.) The EMS allows users of EMS-compliant mobile devices to send and receive text, melodies, pictures, and simple sounds and animations, or a combination thereof. The EMS is also supported by a number of communication standards. One more type of message services is multi-media messaging service (MMS). The MMS enables messages containing rich multimedia content to be exchanged over a wireless network. The MMS content can include any combination of images, animation, audio, video, and text. The MMS is supported by a number of communication standards.

A mobile device having multiple communication modes may support messaging operations according to more than one wireless standard. Therefore, the mobile device may be a multi-mode wireless device (MWD). The MWD allows a user to send and receive voice and data over multiple wireless networks, each operating in accordance with a communication standard. The communication modes include, without limitation, operations in CDMA or GSM based systems, or GSM-based derivatives such as GPRS or UMTS. Other CDMA-based systems are also included, such as CDMA1X, CDMA2000, etc. The MWDs are generally compatible with the SMS, EMS, and MMS for each communication mode for sending and receiving messages.

Each message service has a unique format and protocol for sending and receiving messages. Further, similar message services differ among communication modes in their format and protocol, and may be incompatible with each other. To perform messaging, a user of a conventional MWD must first know which wireless communication mode is available or is currently being used, and then select an appropriate message service for the message in order to send the content. Then, the user must manually select an application that is individually suited for the appropriate message service.

There is therefore a need in the art for a method and apparatus for standardized messaging and automatic selection of a message service based on the contents of the message and an available communication mode.

SUMMARY

Embodiments disclosed herein address the above stated needs by providing a novel and improved method, apparatus, and computer-readable medium for providing transparent messaging by a multi-mode wireless device. A "message" can be any data structure compliant with SMS, EMS, MMS, or any similar or derivative message services for any communication mode supported by the multi-mode wireless device. In accordance with various aspects of the invention, a messaging application provides a plurality of message services and is configured to receive message content from a user for a message to be sent by the multi-mode wireless device. A control processor, under instruction from the messaging application, is configured to determine an available communication mode of the multi-mode wireless device. The control processor is further configured to examine the message content to determine at least one usable message service, from the plurality of message services, that is operable with the available communication mode, and to select a preferred message service from the at least one usable message service.

DETAILED DESCRIPTION

Figure 1:
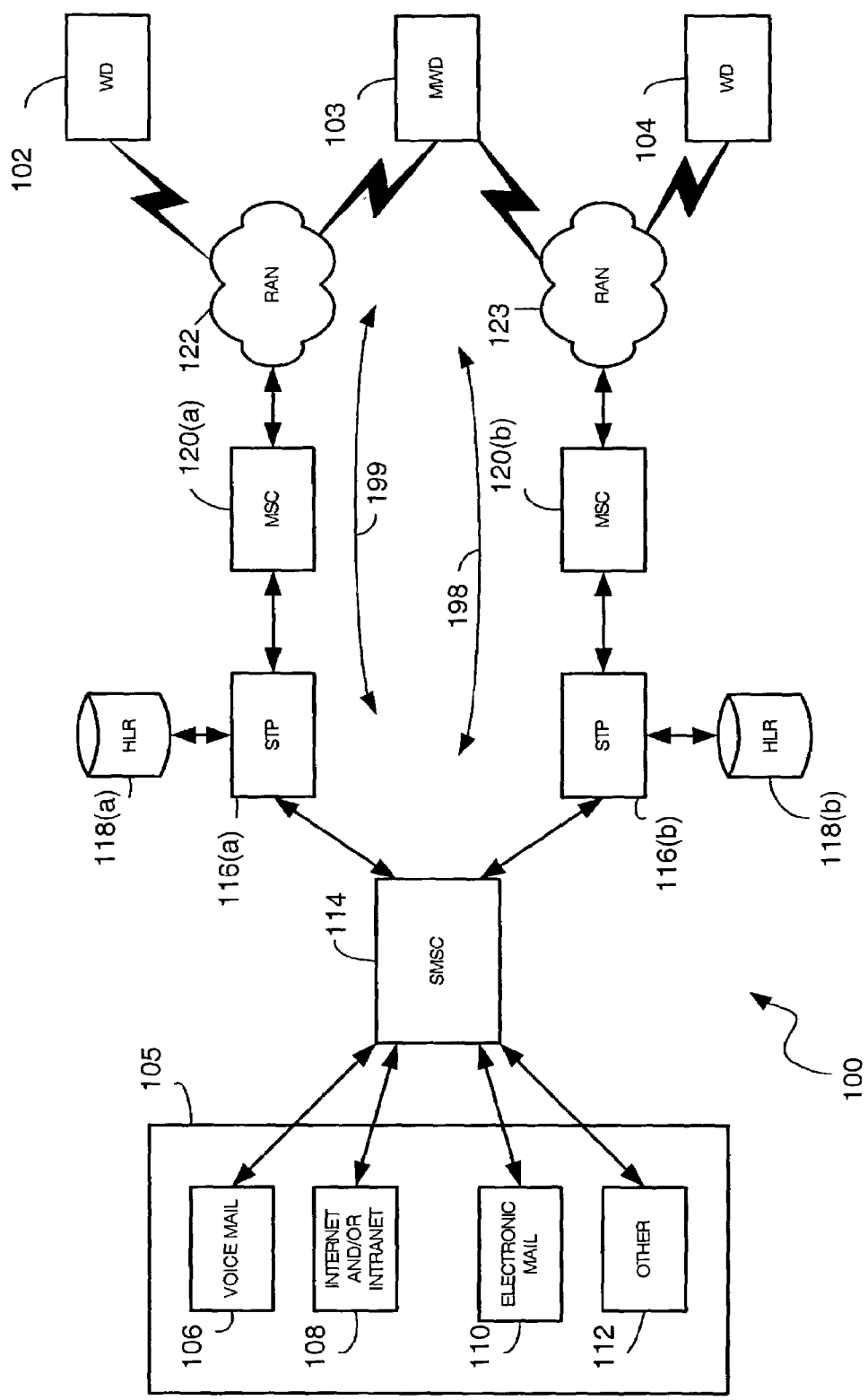
FIG. 1 illustrates a block diagram of a communication system having multiple wireless networks.

FIG. 1 illustrates a wireless communication system 100 capable of operating in accordance with various aspects of the invention. The communications at various interfaces within the wireless communication system 100 may be compliant in accordance with the Interim Standard-41C, or variants thereof. The wireless communication system 100 may be integrated with other data communication systems. During operation, messages are communicated between wireless devices 102, 103, and 104 operated by respective users and one or more external short messaging entities (ESME) 105. Each wireless device may be any type of wireless communication device. Such devices may be connected or integrated with other types of devices, such as computers or devices operating like a computer. The wireless devices may also operate from a fixed location, such as a wireless local loop or a meter reading system, or a combination thereof. The wireless device 103 may be configured for operating in accordance with multiple wireless standards in wireless communications system 100. Therefore, the wireless device 103 may be a MWD.

The ESME 105 may include various entities such as voice mail system 106, the Internet or a closed Intranet 108, electronic mail system 110, and other systems 112 such as fax machines, pagers, terminals or computers. The system 100 includes a short message service center (SMSC) 114, also known as a message center. Other message centers may be employed to handle different message services. The SMSC 114 may be a combination of hardware and software for relaying, storing and forwarding messages between the ESME 105 and the wireless devices, 102, 103 and 104. The network paths 199 and 198 may be used for communications between SMSC 114 and the wireless devices 102, 103 and 104.

The network paths 199 and 198 include one or more signal transfer points (STPs) 116(a) and 116(b), also known as gateways. The STPs 116(a) and 116(b) are connected with the SMSC 114 to enable IS-41C interconnections over signaling system 7 (SS7) links or similar channels with multiple elements. Home location registers (HLR) 118(a) and 118(b) are connected with the STPs 116(a) and 116(b), respectively. Each HLR includes a database containing subscription data and service profiles of users. In response to a request from the SMSC 114, HLR 118(a) or 118(b) provides routing information for an indicated user. Further, if a recipient user is not available when a message delivery is attempted, the HLR 118 signals the SMSC 114 when the recipient user is accessible and when the message is deliverable. Each STP is connected with one or more mobile switching centers (MSC) 120(a) and 120(b). Each MSC performs switching functions and controls message routing to and from respective radio access networks (RANs) 122 and 123.

For purposes of simplicity, system 100 is shown with SMSC 114 in communication with two network paths 199 and 198. Each network path may include one signal transfer point (STP), one mobile switching center (MSC) and one radio access network (RAN). However, additional STPs, MSCs and RANs are also possible in each network path. Accordingly, the system 100 may include the ESME 105, SMSC 114, and a network path having at least one of each of an STP, MSC and RAN. The system 100 may include one or more SMSCs 114 or similar message centers.

In one example, the wireless device 102 is only compatible with the wireless network including the RAN 122 using a first wireless communication mode. Similarly, the wireless device 104 is only compatible with the wireless network including RAN 123 using a second wireless communication mode. Wireless device 102 could not communicate with the system 100 through the network path associated with RAN 123, nor could wireless device 104 communicate with the system 100 through the network path associated with the RAN 122. For example, RAN 122 may operate according to CDMA standard, and RAN 123 operate according to GSM standard. The MWD 103 may operate with both RANs 122 and 123.

For different communication modes such as CDMA and GSM modes, message services may require different formatting. For example, CDMA SMS messages are formatted differently than GSM SMS messages. The CDMA SMS messages include a number of parameters, such as priority, privacy, user response code, deferred delivery time, alert mode, display mode, language, callback number, teleservice ID, etc. GSM SMS messages include different parameters, such as: protocol ID, message class, compression information, and reject duplicate. Even where parameters are similar, their formats may be different. Further, each communication mode has its own distinct protocol stack, timing requirements and error codes as well. The MWD 103, however, is configured to communicate with either RAN 122 or 123, even where they operate according to different communication modes. Wireless devices 102, 103 and 104 can receive different types of messages depending on the services to which they are subscribed. In particular, by operating according to more than one communication mode, the MWD 103 can receive messages from various sources operating in accordance with different communication modes, such as CDMA and GSM modes. However, a message service must be operable with a communication mode being used, i.e. for example CDMA SMS is not operable with GSM-based networks, and therefore can only operate with CDMA-based radio access networks.

The MWD 103 is adapted for performing messaging in the multi-mode environment in a manner that is transparent to a user in accordance with various aspects of the invention. The MWD 103 automatically determines an available communication mode or modes, and examines content of messages to be sent to automatically determine at least one usable message service for the available mode or modes. The MWD 103 then performs a selection process to automatically select the most efficient message service, from the at least one or group of message services, with which to fulfill a user's request to send messages. The selection process may be performed for each message, and as a function of one messaging operation performed by the MWD 103.

Figure 2:
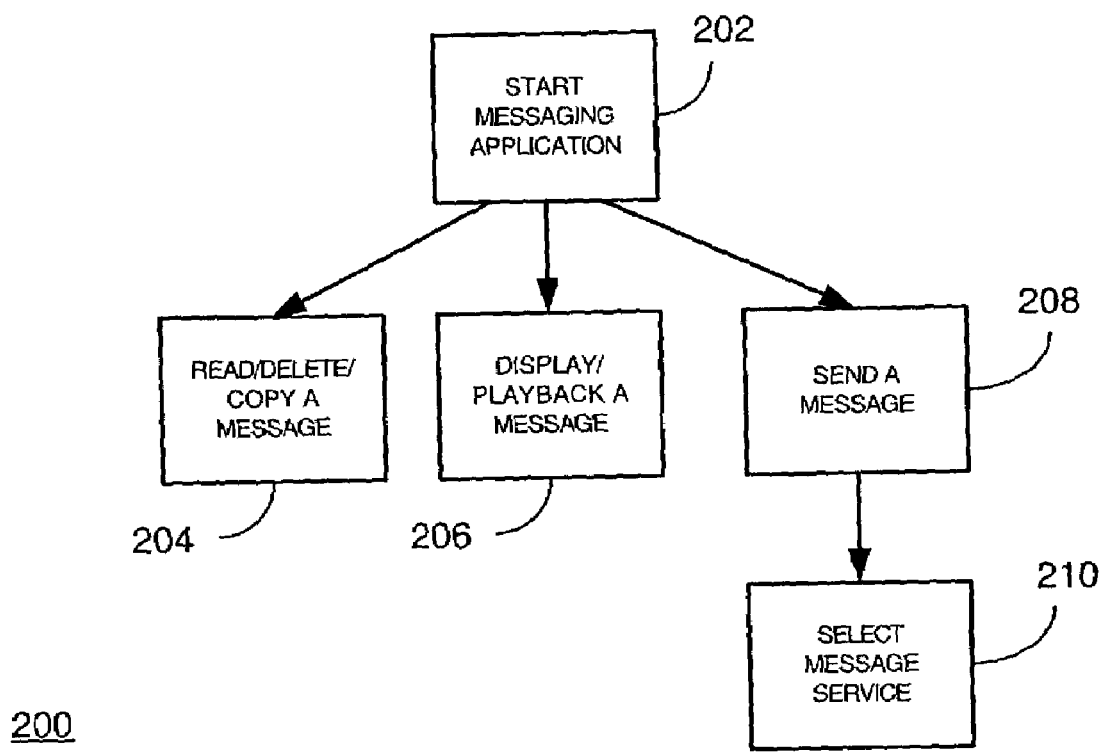
FIG. 2 illustrates a block diagram of a single messaging application for a multi-mode wireless device (MWD).

FIG. 2 illustrates a block diagram of various operating blocks of an integrated messaging application 200 for use in a MWD. Each block represents a software module of the messaging application 200 that can be used with any message service for any communication mode, without the need to switch between the underlying messaging protocols. The messaging application 200 includes a block 202 for starting the messaging application 200. The code relating to block 202 may be stored locally in computer-readable media in the MWD. The code relating to block 202 enables a user to read, delete and/or copy a message via block 204 without regard to where the message was created. The code relating to block 202 also provides mechanisms for display and/or playback of a message via block 206, particularly if the message includes multimedia content, and also without regard to the message service by which the message was created. Furthermore, the code relating to block 202 provides for sending a message via a block 208 automatically without a user having to manually select a message service. The message service used for sending a message is selected via block 210, according to various aspects of the invention.

Figure 3:
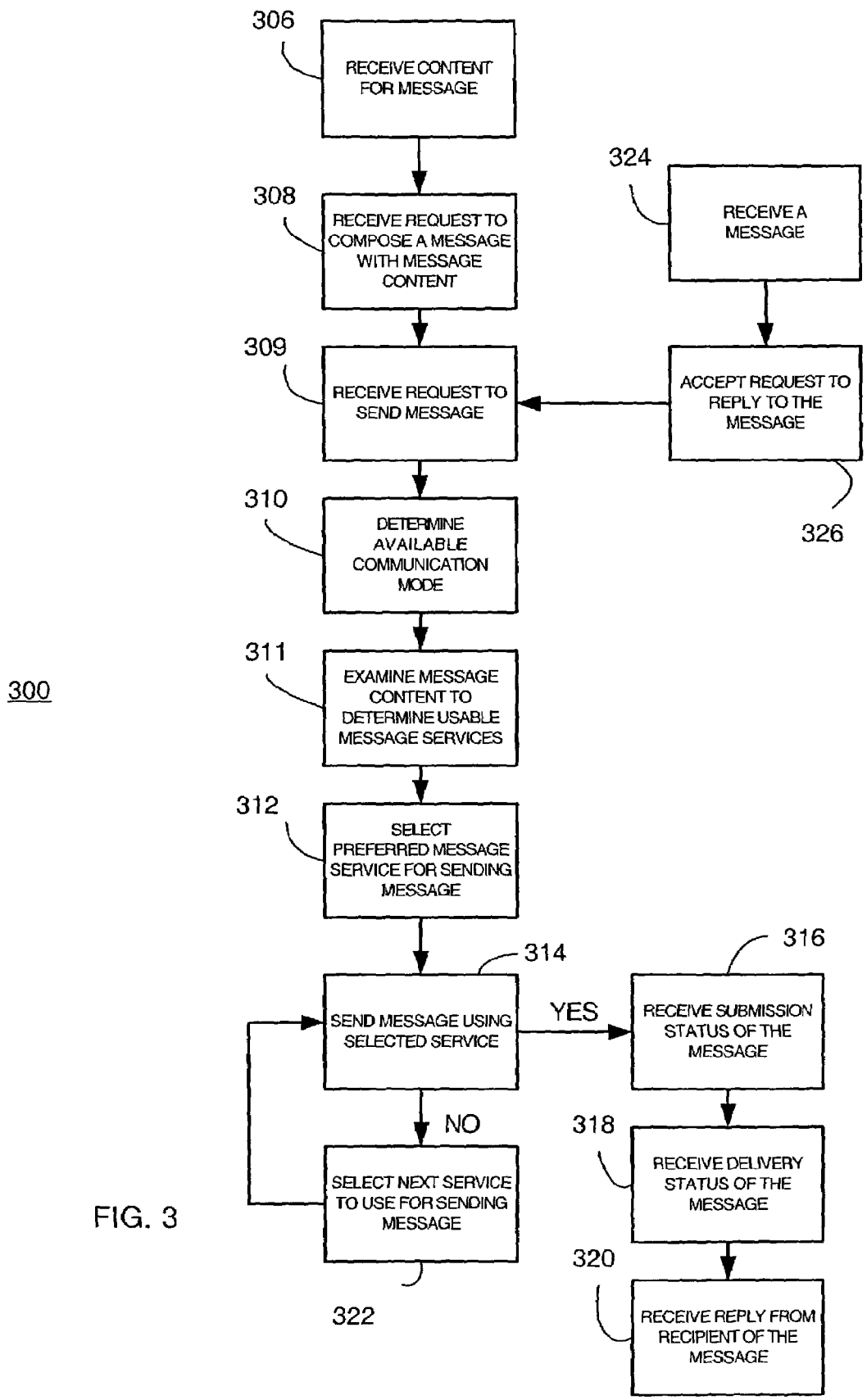
FIG. 3 illustrates a flowchart for selecting a message service in accordance with various aspects of the invention.

FIG. 3 illustrates a flow chart 300 for wireless messaging by MWD 103 in a multi-mode environment. Various steps of flow chart 300 preferably employ an integrated messaging application, such as one illustrated in FIG. 2. The wireless messaging as illustrated in flow chart 300 is also preferably transparent, i.e. the steps of sending and receiving messages are independent of a particular communication mode (CDMA, GSM, etc.), and the message services are selected automatically for the user of the MWD 103. At step 306, the messaging application 200 receives message content. In an aspect of the invention, the messaging application 200 generates a graphical or textual user for a user to access message content stored in the MWD 103, or to provide message content from an external interface, such as a microphone or keypad for example. The message content includes any content type, such as text, data, images, audio, video, etc. At step 308, the messaging application 200 receives a request to compose a message with the received content, and at step 309, receives a request to send the message. At step 310, the messaging application 200 directs a control processor to determine an available communication mode or modes, such as GSM and/or CDMA for the MWD 103. The determination may be based on the current geographic location of the MWD 103 relative to nearby wireless service providers. At step 311, the messaging application 200 directs the control processor to examine the content of the message to determine at least one usable message service that is compatible with the available communication mode or modes. More than one message service may be determined to be usable. At step 312, the messaging application 200 selects a preferred message service for sending the message based on the content of the message and the available communication mode. The control processor may use different criteria for the selection. For example, if the message content includes video or voice data, an MMS may be selected for the available communication mode. In another example, if the message content exceeds a data size limit of the SMS for the available communication mode a first usable one of either an EMS or the MMS may be selected for the available communication mode. Otherwise, if the message content is text-only and of limited size, a first usable one of the SMS, EMS, or MMS may be selected for the available communication mode.

The selected preferred message service is compatible with an available communication mode. For instance, according to one aspect of the invention, SMS and EMS messages can be sent using CDMA, GSM, GPRS, WCDMA, etc. modes. MMS messages can be sent using CDMA, HDR, GPRS, WCDMA Packet domain, etc., modes. The MWD 103 may rank the message services, and select a preferred message service according to a prioritization scheme. For example, an SMS service for an available communication mode may be selected first for text messages. If transmission of the message fails, or the communication mode on which the message service is based loses service, a next preferred message service is selected. If all usable message services have been tried, the messaging application continues its attempt to send the message within a timeout period specified by the MWD 103 or user preference. The MWD 103 will send the message at step 314, but if the selected message service fails, the messaging application selects the next preferred message service at step 322, accordingly.

If the message is sent successfully, at step 316, the MWD 103, via the messaging application 200, receives a submission status via the same message service used for sending the message. At step 318, the messaging application 200 receives a delivery status of the message, and at 320 receives a reply from a recipient of the message, if the reply was requested. The reply message can be received according to the same message service, or by a different message service, than was selected for sending the original message.

The flow chart 300 also includes steps of receiving a message using an active message service, at step 324, and accepting a request to reply to the message, at step 236. The messaging application 200 may default to the active message service as the preferred message service at the step 312. However, if the user adds content to a reply which the current message service does not support, a different message service may be selected based on the criteria discussed in reference to step 312.

Figure 4:
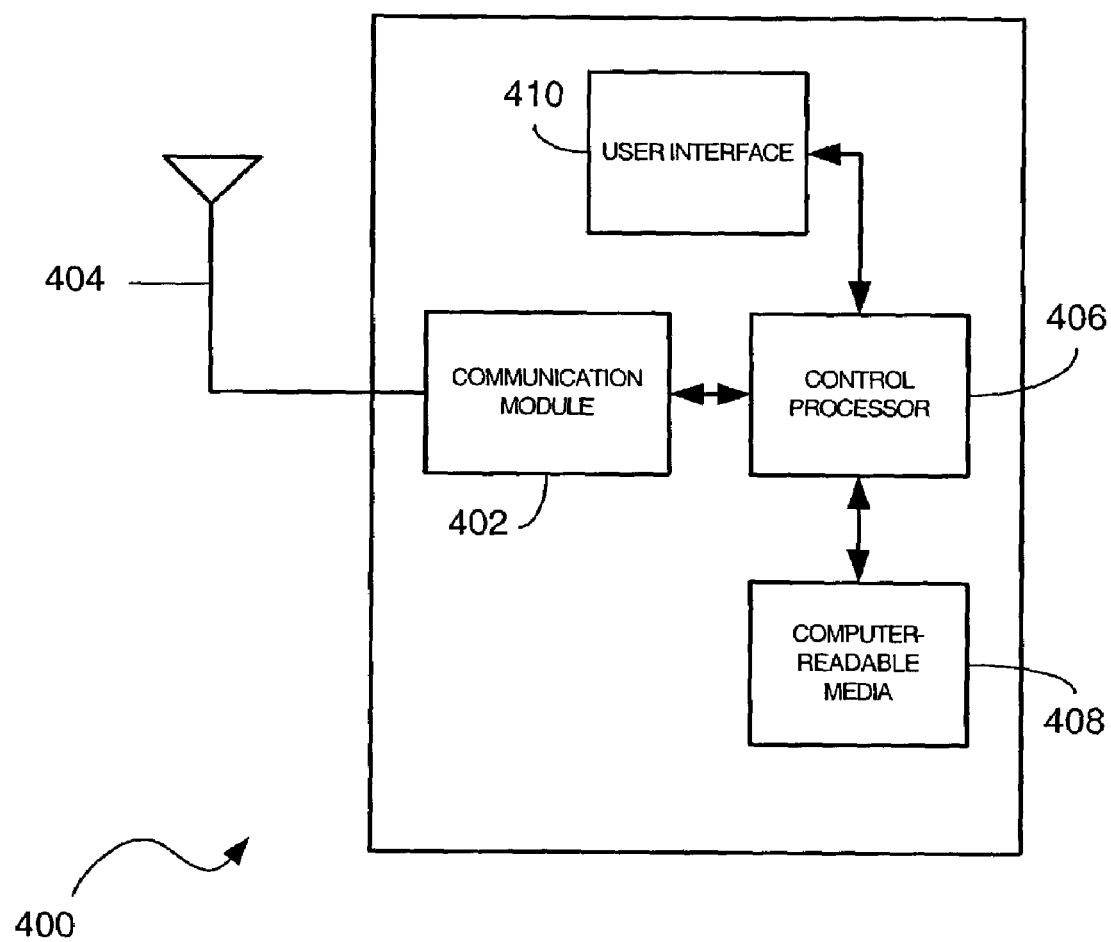
FIG. 4 illustrates a simplified block diagram of a MWD for selecting a message service in accordance with various aspects of the invention.

FIG. 4 is a simplified block diagram 400 of MWD 103 for communicating messages in a multi-mode environment having multiple message services. The MWD 103 includes a communication module 402 capable of operating in accordance with various standards for wireless communications. The communication module 402 sends and receives control and traffic signals via antenna 404. The MWD 103 also includes a control processor 406 and computer-readable media 408. The computer-readable media 408 stores instruction code for execution by the control processor 406. The MWD 103 also includes a user interface 410 for receiving commands, requests, instructions, and data from a user, and for providing information to the user via, for example, a display.

The instruction code resident in the computer-readable media 408 includes messaging application 200. The messaging application 200 supports a number of different message services (i.e. SMS, EMS, and MMS) that are compatible with and usable by the MWD 103 According to various aspects of the invention, the messaging application 200 automatically manages messaging processes without requiring a user to specify a message type (SMS, EMS, etc.) or a communication mode (GSM, CDMA, etc.) for sending the message. The user may add any type of content to a message, and then send the message without needing to specify which message service to use.

The instruction code includes code for selecting a message service based on the content of the message. The instruction code further includes code for executing the selected message service. The instruction code instructs the control processor 406 to determine an available communication mode of the multi-mode wireless device. The message content is examined to determine at least one usable message service that is operable with the available communication mode. The one or more usable message services are determined from all of the message services supported by the MWD 103. The instruction code further instructs the control processor to select a preferred message service from the at least one usable message service.

Those of skill would further appreciate that the various illustrative logical blocks, modules, functional blocks, and algorithm steps described in connection with the embodiments disclosed herein may be implemented as electronic hardware, computer software stored on computer-readable media, or combinations thereof. To clearly illustrate this interchangeability of hardware and software, various illustrative components, blocks, modules, circuits, and steps have been described above generally in terms of their functionality.

Furthermore, the various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a wireless device. In the alternative, the processor and the storage medium may reside as discrete components in a user terminal connected with the wireless device.

What is claimed is:

1. An apparatus for wireless communication of messages in a multi-mode environment, comprising:

computer-readable media storing a messaging application which provides a plurality of message services, the messaging application being configured for receiving message content for wireless communication of a message;

a control processor, under instruction from the messaging application, configured for determining an available communication mode in the multi-mode environment, examining the message content to determine at least one usable message service from the plurality of message services that is operable with the available communication mode, and selecting a preferred message service from the at least one usable message service; and wherein the control processor is configured for selecting the preferred message service according to a set of criteria, wherein:

if the message content includes video or voice data, selecting a multi-media messaging system (MMS) for the available communication mode;

if the message content exceeds a data limit of a short message service (SMS) for the available communication mode, selecting a first usable one of an enhanced message service (EMS) and the MMS for the available communication mode; and otherwise, selecting a first usable one of the SMS, EMS, and MMS for the available communication mode.

2. The apparatus as set forth in claim 1, further comprising a communication module configured for wireless communication of the message according to the preferred message service.

3. The apparatus as set forth in claim 2, wherein if the wireless communication of the message according to the preferred message service fails, the control processor is configured for selecting a next preferred message service.

4. The apparatus as set forth in ciaim 1 wherein the message content includes a reply to a received message via an active message service.

5. The apparatus as set forth in claim 4, wherein the control processor is configured for selecting the preferred message service corresponding to the active message service.

6. A method for communicating messages from a wireless device in a multi-mode environment, comprising:

receiving message content at a messaging application for a message to be sent by the wireless device, wherein the messaging application provides a plurality of message services;

determining an available communication mode of the wireless device;

examining the message content to determine at least one usable message service from the plurality of message services that is operable with the available communication mode;

selecting a preferred message service from the at least one usable message service for communicating the message from the wireless device and wherein the method further comprises: if the message content includes video or voice data, selecting a multi-media messaging system (MMS) for the available communication mode;

if the message content exceeds a data limit of a short message service (SMS) for the available communication mode, selecting a first usable one of an enhanced message service (EMS) and the MMS for the available communication mode; and otherwise selecting a first usable one of the SMS, EMS, and MMS for the available communication mode.

7. The method as set forth in claim 6, further comprising sending the message using the preferred message service.

8. The method as set forth in claim 7 wherein if sending the message fails, selecting a next preferred message service from the at least one usable message service.

9. The method as set forth in claim 6 wherein the message content includes a reply to a received message via an active message service.

10. The method as set forth in claim 9, wherein the selected preferred message service corresponds to the active message service.

11. A computer-readable media for communicating messages from a wireless device in a multi-mode environment, the computer readable media storing code comprising:

code for receiving message content at a messaging application for a message to be sent by the wireless device, wherein the messaging application provides a plurality of message services;

code for determining an available communication mode of the multi-mode wireless device;

code for examining the message content to determine at least one usable message service from the plurality of message services operable with the available communication mode;

code for selecting a preferred message service from the at least one usable message service; and wherein said computer-readable media further comprises:

code for selecting a multi-media messaging system (MMS) for the available communication mode if the message content includes video or voice data;

code for selecting a first usable of enhanced message service (EMS) or the MMS for the available communication mode if the message content exceeds a data limit of a short message service (SMS) for the available communication mode; and code for selecting a first usable of the SMS, EMS, or MMS for the available communication mode if the message content includes other than video or voice data and does not exceed the data limit.

12. A multi-mode wireless device for wireless communication of messages in a multi-mode environment, comprising:

a control processor, under instruction from a messaging application, configured for determining an available communication mode in the multi-mode environment, examining a message content to determine at least one usable message service from a plurality of message services operable with the available communication mode, and selecting a preferred message service from the at least one usable message service;

wherein the control processor is configured for selecting the preferred message service according to a set of criteria, wherein:

if the message content includes video or voice data, selecting a multi-media messaging system (MMS) for the available communication mode;

if the message content exceeds a data limit of a short message service (SMS) for the available communication mode, selecting a first usable one of an enhanced message service (EMS) and the MMS for the available communication mode;

otherwise, selecting a first usable one of the SMS, EMS, and MMS for the available communication mode; and a communication module configured for wireless communication in accordance with the multi-mode environment, and the message according to the preferred message service.

13. A communication system providing multi-mode wireless communication environment, comprising:

a base station capable of communicating in accordance with multiple wireless standards corresponding to the multi-mode wireless communication environment;

a multi-mode wireless device for wireless communication of messages with the base station in the multi-mode wireless communication environment, configured for determining an available communication mode in the multi-mode environment, examining a message content to determine at least one usable message service from a plurality of message services operable with the available communication mode, selecting a preferred message service from the at least one usable message service, communicating in accordance with the multi-mode wireless communication environment and sending the message according to the preferred message service and wherein the multi-mode wireless device is configured for selecting the preferred message service according to a set of criteria, wherein:

if the message content includes video or voice data, selecting a multi-media messaging system (MMS) for the available communication mode;

if the message content exceeds a data limit of a short message service (SMS) for the available communication mode, selecting a first usable one of an enhanced message service (EMS) and the MMS for the available communication mode; and otherwise, selecting a first usable one of the SMS, EMS, and MMS for the available communication mode.

\* \* \* \* \*